United States Patent
Sekhar

(10) Patent No.: US 10,005,892 B2
(45) Date of Patent: Jun. 26, 2018

(54) METHOD FOR PRODUCING DEVULCANIZED RUBBER AND AN APPARATUS THEREFOR

(71) Applicant: SEKHAR RESEARCH INNOVATIONS SDN. BHD., Petaling Jaya, Selangor (MY)

(72) Inventor: Gopinath B. Sekhar, Petaling Jaya (MY)

(73) Assignee: SEKHAR RESEARCH INNOVATIONS SDN. BHD., Petaling Jaya, Selangor (MY)

(*) Notice: Subject to any disclaimer, the term of this patent is extended or adjusted under 35 U.S.C. 154(b) by 0 days. days.

(21) Appl. No.: 15/271,673

(22) Filed: Sep. 21, 2016

(65) Prior Publication Data

US 2017/0009044 A1 Jan. 12, 2017

Related U.S. Application Data

(62) Division of application No. 14/427,674, filed as application No. PCT/MY2013/000136 on Jul. 29, 2013, now Pat. No. 9,550,880.

(30) Foreign Application Priority Data

Sep. 12, 2012 (MY) .......................... PI 2012700640

(51) Int. Cl.
   *B01J 10/00* (2006.01)
   *C08K 3/34* (2006.01)
   (Continued)

(52) U.S. Cl.
   CPC .............. *C08K 3/346* (2013.01); *B01J 8/087* (2013.01); *B01J 8/10* (2013.01); *C08C 19/08* (2013.01);
   (Continued)

(58) Field of Classification Search
   CPC .. C08C 19/08; C08J 11/10; C08J 11/16; C08J 11/26; C08J 2319/00; C08J 2321/00;
   (Continued)

(56) References Cited

U.S. PATENT DOCUMENTS 4,506,982 A * 3/1985 Smithers ............. B01F 7/00641
                                               366/142
5,478,147 A    12/1995 O'Brien et al.
                  (Continued)

FOREIGN PATENT DOCUMENTS

| JP | 6-179215 A | 6/1994 |
|---|---|---|
| WO | 2011/113148 A1 | 9/2011 |
| WO | 2011/158024 A1 | 12/2011 |

OTHER PUBLICATIONS

International Search Report for PCT/MY2013/000136 dated Nov. 4, 2013.

*Primary Examiner* — William K Cheung
(74) *Attorney, Agent, or Firm* — Sughrue Mion, PLLC

(57) ABSTRACT

A method for producing devulcanized rubber and an apparatus (100) therefor. The method for producing devulcanized rubber comprises the steps of (1) providing vulcanized rubber particles with a pre-determined particle size and (2) devulcanizing the vulcanized rubber particles. The vulcanized rubber particles are devulcanized mechanically by impact forces and devulcanized chemically by a chemical composition. The impact forces break sulphur-sulphur and sulphur-carbon bonds of the vulcanized rubber particles causing surfaces of the rubber to become receptive in reacting with the chemical composition and the chemical composition renders the sulphur passive to prevent reattachment of the bonds, of which the chemical composition comprises at least one accelerator, at least one inorganic activator and at least one organic activator.

8 Claims, 1 Drawing Sheet

(51) Int. Cl.
*C08C 19/08* (2006.01)
*C08J 11/10* (2006.01)
*C08J 11/16* (2006.01)
*B01J 8/08* (2006.01)
*B01J 8/10* (2006.01)
*C08K 5/01* (2006.01)
*C08J 11/26* (2006.01)

(52) U.S. Cl.
CPC ............... *C08J 11/10* (2013.01); *C08J 11/16* (2013.01); *C08J 11/26* (2013.01); *C08K 5/01* (2013.01); *B01J 2208/00212* (2013.01); *B01J 2208/00858* (2013.01); *C08J 2319/00* (2013.01); *C08J 2321/00* (2013.01); *Y02W 30/702* (2015.05); *Y02W 30/705* (2015.05)

(58) Field of Classification Search
CPC .... B01J 8/087; B01J 8/10; B01J 2208/00212; B01J 2208/00858; C08K 3/346; C08K 5/01; Y02W 30/705; Y02W 30/702
USPC .......................................................... 422/129
See application file for complete search history.

(56) References Cited

U.S. PATENT DOCUMENTS

| | | |
|---|---|---|
| 6,194,519 B1 | 2/2001 | Blalock |
| 6,313,183 B1 | 11/2001 | Pillai et al. |
| 6,515,059 B1 | 2/2003 | Davis |
| 6,579,482 B1 | 6/2003 | Faust et al. |
| 2009/0137690 A1 | 5/2009 | Barnat |
| 2012/0021155 A1 | 1/2012 | Chen |

* cited by examiner

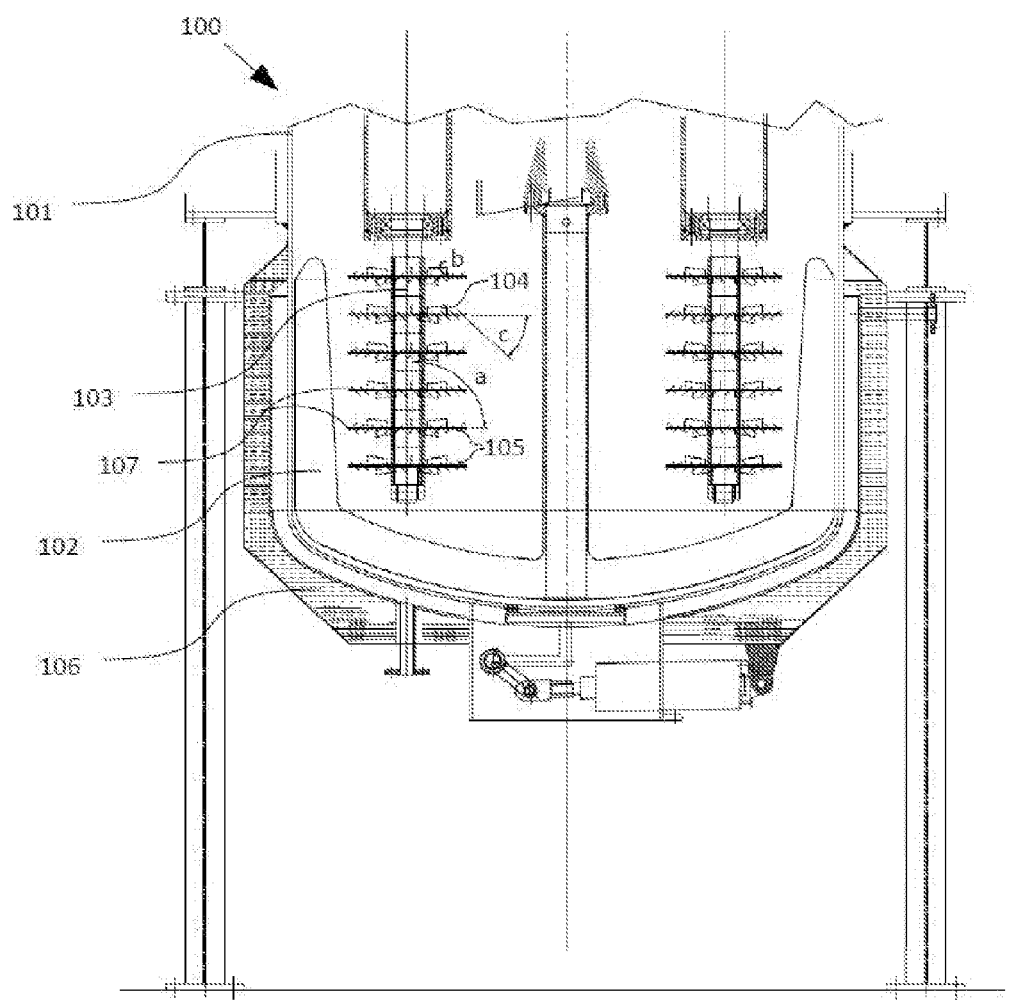

METHOD FOR PRODUCING DEVULCANIZED RUBBER AND AN APPARATUS THEREFOR

CROSS REFERENCE TO RELATED APPLICATIONS

This is a Divisional of application Ser. No. 14/427,674 filed Mar. 12, 2015, now U.S. Pat. No. 9,550,880, claiming priority based on International Application No. PCT/MY2013/000136 filed Jul. 29, 2013, claiming priority based on Malaysian Patent Application No. PI 2012700640, filed Sep. 12, 2012, the contents of all of which are incorporated herein by reference in their entirety.

FIELD OF THE INVENTION

The present invention relates to a method for producing devulcanized rubber and an apparatus therefor. In particular, the present invention relates to a method and an apparatus for producing devulcanized rubber via mechanical and chemical process.

BACKGROUND OF THE INVENTION

In a general rubber devulcanization, the process involves cleaving of the monosulfidic, disulfidic and polysulfidic crosslinks (carbon-sulphur or sulphur-sulphur bonds) existing in a vulcanized rubber. Technologies that were developed for this purposeful process, typically adopt techniques involving chemical, ultrasonic, microwave or biological devulcanization.

It is known that in chemical devulcanization, the process makes use of materials such as organic solvent, oil and chemicals, or organic compounds for devulcanizing rubber. Ultrasonic devulcanization and microwave devulcanization, on the other hand, make use of ultrasonic waves and microwave heat to devulcanize the rubber, and biological devulcanization is carried out through microbial attacks on the sulphur crosslinks of the vulcanized rubber so as to break the bonds.

There are several prior arts divulged the methods for producing devulcanized rubber. U.S. Pat. No. 5,770,632 discloses a method of reclaiming elastomeric material, or known as De-Link process, through the use of a chemical mixture that is capable of initiating proton exchange at a controlled temperature. The prior art discloses a method for producing devulcanized rubber via vigorous mixing of the rubber powder by stirring prior to the addition of the chemical composition and processing in a roll mill.

European Patent No. 1 242 520 B1 owned by Levgum, Ltd. discloses a modifier for devulcanizing cured elastomer and a method to devulcanize rubber using said modifier. As discussed in the prior art, the cured elastomers are brought to a stressed polymer structure state and then treated by organic cations that are generated by the modifier as claimed.

U.S. patent application Ser. No. 11/636,611 owned by The SF Materials Corporation discloses a method of devulcanizing rubber by contacting the vulcanized rubber with turpentine liquid in a reaction mixture in the absence of an alkali metal. The reaction mixture further comprises a solvent or a liquid that is immiscible with the turpentine liquid. The vulcanized rubber is contacted with the turpentine liquid in the presence of an energy input comprising thermal energy, microwave energy, ultrasonic energy, mechanical shear-forces or mixtures thereof.

U.S. Pat. No. 4,161,464 owned by BF Goodrich Company describes a method of devulcanizing rubber through a phase transfer chemical reaction catalysed with certain onium salts that allows the transport of hydroxide ions into vulcanized rubber particles to selectively cleave polysulfide crosslinks for producing a recyclable devulcanized rubber. The devulcanizing process involves the steps of swelling vulcanized rubber particles in an organic solvent having dissolved therein an onium salt, and thereon contacting the swollen vulcanized particles with an aqueous solution of a base to provide sufficient hydroxide ions for the phase transfer reaction.

U.S. Pat. No. 6,387,966 B1 describes a method of devulcanizing waste rubber by adding a modifying composition to waste rubber particles and subsequently crushing the waste rubber particles through a roll mill thereby creating modified crushed particles. The modification of the rubber particles involves the breaking of at least 70% sulphur to sulphur bonds and no more than 10 to 15% carbon to carbon bonds.

U.S. Pat. No. 7,189,762 B2 discloses a method for modifying crosslinked rubber. The method for modifying crosslinked rubber is carried out by using mechanical elongational and shear force in the presence of carbon dioxide in a supercritical fluid state.

PCT Patent Application No. PCT/CA2011/000285 relates to a method of regenerating vulcanized crumb rubber comprising the steps of mixing the crumb rubber and a lubricant at room temperature, transferring the mixture to a thermokinetic mixer having a rotor shaft containing blades to increase temperature of the mixture until a devulcanizing temperature is reached, reducing the temperature of the mixture and recovering the regenerated rubber. In the prior art, the method of regenerating vulcanized crumb rubber utilizes higher range of devulcanizing temperature, hence this requires increased energy consumption.

The conventional rubber devulcanizing technologies as disclosed in preceding prior art documents are mostly impractical to produce a viable substitute to virgin rubber due to the limitation of scalability to large volume production. Other problems encountered by the conventional recycling technologies are intensive energy consumption, poor cure safety, poor material compatibility during processing, obtention of undesirable product properties and performance, as well as exhibiting poor shelf life.

SUMMARY OF THE INVENTION

As a result, it is desirable to introduce a method for producing devulcanized rubber in large production scale to provide a viable substitute to virgin material and the devulcanized rubber shall have its properties as a substitute to the original rubber. The method shall produce the devulcanized rubber via a highly energy efficient technique.

It is an objective of the present invention to provide a method for producing devulcanized rubber to be as a viable substitute to virgin rubber.

It is another objective of the present invention to provide a method for producing devulcanized rubber in large volume by establishing high scalability.

It is further an objective of the present invention to provide a method for producing devulcanized rubber using a highly energy efficient technique at a controlled temperature range.

It is still an objective of the present invention to provide a method for producing devulcanized rubber by the combined use of mechanical impact forces and a chemical composition.

It is yet an objective of the present invention to provide a method for producing devulcanized rubber through recycling of rubber waste.

It is also an objective of the present invention to provide an apparatus for producing devulcanized rubber by mechanical revolving means to generate impact forces.

It is further another objective of the present invention to obtain a devulcanized rubber which has good maintenance of material properties similar to the virgin rubber.

It is still another objective of the present invention to obtain a devulcanized rubber which is stable over rubber hardening so as to have a pro-longed shelf life.

The present invention relates to a method for producing devulcanized rubber comprising the steps of providing vulcanized rubber particles with a pre-determined particle size and devulcanizing the vulcanized rubber particles, characterized in that the vulcanized rubber particles are devulcanized mechanically by impact forces and devulcanized chemically by a chemical composition, whereby the impact forces break sulphur-sulphur and sulphur-carbon bonds of the vulcanized rubber particles causing surfaces of the rubber to become receptive in reacting with the chemical composition and the chemical composition renders the sulphur passive to prevent reattachment of the bonds, of which the chemical composition comprises at least one accelerator, at least one inorganic activator and at least one organic activator.

The present invention also relates to an apparatus for producing devulcanized rubber. The apparatus comprises a devulcanization tank in which the reaction between vulcanized rubber particles and a chemical composition is carried out, at least one mass stirrer positioned in the devulcanization tank in which the mass stirrer rotates in circular motion to generate impact forces, at least one rotating shaft positioned in the devulcanization tank in which the rotating shaft has at least one axial blade and at least one radial blade to facilitate impact forces generation and a blanket of cooling fluid enveloping the devulcanization tank to control the temperature, wherein the impact forces generated from the mass stirrer, the axial blade and the radial blade of the rotating shaft cause the vulcanized rubber particles to react with the chemical composition for producing devulcanized rubber.

BRIEF DESCRIPTION OF THE DRAWING

For the purpose of facilitating an understanding of the invention, there is illustrated in the accompanying drawings the preferred embodiments from an inspection of which when considered in connection with the following description, the invention, its construction and operation and many of its advantages would be readily understood and appreciated.

The FIGURE shows an apparatus (100) for producing devulcanized rubber according to the present invention.

DETAILED DESCRIPTION OF THE INVENTION

The present invention relates to a method and an apparatus for producing devulcanized rubber. Hereinafter, the method and the apparatus shall be described according to the preferred embodiments of the present invention and by referring to the accompanying description and drawing. However, it is to be understood that limiting the description to the preferred embodiments of the invention and to the drawing is merely to facilitate discussion of the present invention and it is envisioned that those skilled in the art may devise various modifications without departing from the scope of the appended claim.

As represented in the FIGURE, the method and the apparatus according to the present invention will be hereinafter described in greater detail.

The present invention discloses a method for producing devulcanized rubber comprising the steps of providing vulcanized rubber particles with a pre-determined particle size and devulcanizing the vulcanized rubber particles, characterized in that the vulcanized rubber particles are devulcanized mechanically by impact forces and devulcanized chemically by a chemical composition, whereby the impact forces break sulphur-sulphur and sulphur-carbon bonds of the vulcanized rubber particles causing surfaces of the rubber to become receptive in reacting with the chemical composition and the chemical composition renders the sulphur passive to prevent reattachment of the bonds, of which the chemical composition comprises at least one accelerator, at least one inorganic activator and at least one organic activator. However, the carbon-carbon bonds of the rubber shall be remained intact to maintain integrity of the rubber macromolecules.

In the present invention, the rubber devulcanization or also known as rubber activation is effected by the mechanical impact forces on the rubber particulates and the addition of the chemical composition within the time frame when the vulcanized rubber particles are being receptive for chemical reaction. The impact forces break the sulphur-sulphur and sulphur-carbon bonds and therefore this causes the surfaces of the rubber to become receptive or active towards the chemical composition. Thereafter, the chemical composition reacts with the sulphur atoms of the rubber particles, making them passive to prevent reformation of the bonds.

According to the present invention, the vulcanized rubber particles used are preferably within a size ranging from 20 to 140 Mesh, more preferably 40 Mesh, depending on the costing and recoverable properties of the rubber. The vulcanized rubber particles are preferably but not limited to powder form. The vulcanized rubber particles are obtained from waste rubber such as old tires, which are also known as End of Life Tires (ELT), and the batch size used in the production of devulcanized rubber varies. It would be obvious to a person skilled in the art that higher batch size decreases the efficiency to produce devulcanized rubber. Batch size of up to 1 or 2 tonnes of rubber could still be used. However, at this load of rubber, the apparatus may not provide optimum efficacy or performance. Therefore, the batch size which is used in the present invention is preferably but not limited to 350 kg since using this batch size is more manageable in processing as compared to higher loads of rubber.

In a preferred embodiment of the present invention, the chemical composition comprises of at least an accelerator, at least an inorganic activator and at least an organic activator. The accelerator used in the present invention is preferably N-Cyclohexyl-2-benzothiazole sulfenamide (CBS) due to its non-carcinogenicity. Another non-carcinogenic accelerator which is alternatively used in the present invention is Di-isopropyl xanthogen polysulphide. It should be appreciated that any other types or classes of accelerators known to a person skilled in the art may also be used, for instance, Diphenylguanidine, 2-Mercaptobenzothiazole, 2-(n-Morpholinyl)-mercaptobenzothiazole and Hexamethylenetetramine. However, these accelerators have been found to contain nitrosamine, of which the nitrosamine is carcinogenic. As such, the devulcanized rubber produced using these accelerators may pose health issues and therefore they may not be the desired accelerators. Further, these accelerators contribute to issues in terms of cure safety to the devulcanized rubber. Since these accelerators other than the CBS are undesired in the present invention, it is therefore that the CBS is the preferred accelerator used in the present invention. Preferably, the accelerator is used in an amount ranging from 0.30 to 0.75 parts per hundred rubber (phr).

In the present invention, the preferred inorganic activator is zinc oxide and it is used in an amount ranging from 0.30 to 0.70 parts per hundred rubber (phr). Further, the preferred organic activator is stearic acid and it is used in an amount ranging from 1.50 to 2.50 parts per hundred rubber (phr). Generally, the overall amount of chemical composition used ranges from 0.75 to 3.50 parts per hundred rubber (phr).

The method for producing devulcanized rubber of the present invention is a highly energy efficient technique, wherein the step of devulcanizing the vulcanized rubber particles is performed at a temperature ranging from 60° C. to 100° C. and preferably at an optimum temperature of 80° C. Also, the batch time of devulcanizing the rubber ranges from 10 to 15 minutes.

In another embodiment of the present invention, the method for producing devulcanized rubber further comprises a step of introducing a plasticizer or clay or a combination thereof to the devulcanized rubber. Both of the plasticizer and the clay are optionally added as further ingredients to the devulcanized rubber and each of these ingredients is used in an amount ranging from 0 to 15 parts per hundred rubber (phr).

Preferably, the plasticizer used is napthenic oil for reducing viscosity of the reacted mixture. It should be noted that other types or classes of plasticizers known to a person skilled in the art may be used, such as reclaim rubber. It should be also noted that aromatic oils can be used as the plasticizer but napthenic oil is preferred since it is less carcinogenic as compared to the aromatic oils. The plasticizer impedes the devulcanization process of the rubber particles, thus it is preferably introduced after the rubber devulcanization process. In the present invention, clay is used as a filler. It should be known to the skilled person that the clay used herein also functions as a non-black reinforcing agent and a processing aid. The clay can be introduced into the process either prior to or after the devulcanizing step of rubber. The clay can be also introduced together with the chemical composition.

Further, the method for producing devulcanized rubber of the present invention further comprises a step of shaping the devulcanized rubber into a desired form. In a preferred embodiment, the shaping step is performed after the step of introducing a plasticizer or clay or a combination thereof to the devulcanized rubber if the plasticizer and the clay are used as further ingredients.

It is preferred that the step of shaping the devulcanized rubber is to be performed after the rubber devulcanization when the rubber is still being receptive, usually within a time frame of 24 hours. However, immediate processing after devulcanization is preferred to prevent the devulcanized rubber from retracting to its original vulcanized form.

The shaping step is carried out by forming the devulcanized rubber into either extrudates, pellets, agglomerates, sheets or powder or any combination thereof. Specifically, the shaping step is performed by passing the devulcanized rubber through an extruder followed by a refiner mill. The end product would be in the form of agglomerates that is further cooled using a cooling conveyer or other cooler means and subsequently sent for packaging.

In the present invention, an apparatus (100) for producing devulcanized rubber via a method as described above is illustrated in the FIGURE. The apparatus (100) for producing devulcanized rubber comprising a devulcanization tank (101) in which the reaction between vulcanized rubber particles and a chemical composition is carried out, at least one mass stirrer (102) positioned in the devulcanization tank (101) in which the mass stirrer (102) rotates in circular motion to generate impact forces, at least one rotating shaft (103) positioned in the devulcanization tank (101) in which the rotating shaft (103) has at least one axial blade (104) and at least one radial blade (105) to facilitate impact forces generation and a blanket of cooling fluid (106) enveloping the devulcanization tank (101) to control the temperature, wherein the impact forces generated from the mass stirrer (102), the axial blade (104) and the radial blade (105) of the rotating shaft (103) cause the vulcanized rubber particles to react with the chemical composition for producing devulcanized rubber.

Further, the present invention claims that there is at least one mass stirrer (102) positioned in the devulcanization tank (101) in which the mass stirrer (102) rotates in circular motion to generate impact forces on the vulcanized rubber particles. Aside from the generation of impact forces, the mass stirrer (102) circulates the reaction mixture in the devulcanization tank (101) to ensure that the reaction mixture is homogeneous and stays in contact with the rotating shaft (103). The mass stirrer (102) is operated electrically by a motor.

Besides, at least one rotating shaft (103) is positioned in the devulcanization tank (101) in which the rotating shaft (103) has at least one axial blade (104) and at least one radial blade (105) to facilitate impact forces generation. The rotating shaft (103) which operates independently from the mass stirrer (102) is driven by another motor. Other than facilitating the generation of impact forces, the axial blade (104) and the radial blade (105) of the rotating shaft (103) also ensure that the reaction mixture is formed into micron particle sizes for maximum reactivity.

As claimed in the present invention, the impact forces generated from the mass stirrer (102), the axial blade (104) and the radial blade (105) of the rotating shaft (103) break the sulphur-sulphur and sulphur-carbon bonds of the vulcanized rubber particles and therefore causing the surfaces of the rubber to become receptive in reacting with the chemical composition.

According to the present invention, the rotating shaft (103) further comprising a plurality of branching members (107) extended perpendicularly from the rotating shaft (103) with a first angle (a), as illustrated in the FIGURE. The first angle (a) is preferably 90°. In addition, the radial blade (105) is attached to the branching members (107) of the rotating shaft (103). The radial blade (105) is preferably trapezium in shape having an upper lateral with a second angle (b), as illustrated in FIG. 1. The second angle (b) is preferably 8°. The radial blade (105) is tilted from the branching members (107) at a third angle (c), as shown in FIG. 1. The third angle (c) ranges from 19° to 45°, and is preferably 45°.

In a preferred embodiment of the present invention, the mass stirrer (102) of the apparatus (100) rotates at an optimum speed of 24 rpm. In the preferred embodiment, both the rotating shaft (103) and the branching members (107) rotate at a speed ranging from 2000-3300 rpm. In the present invention, the optimum speed of 3000 rpm is practically used for systems with large batch capacity in bulk volume rubber production. However, higher speeds of more than 3300 rpm are operable in small bench and lab units.

Nevertheless, it would not be practical for actual processing of the devulcanized rubber at 500 kg/hour to 2 Mt/hour.

In a preferred embodiment of the present invention, the apparatus (100) is enveloped with a blanket of cooling fluid (107) to control the temperature of the devulcanization tank (101) to a range of 60° C. to 100° C. via heat dissipation. The cooling fluid (107) is chilled water. Ethylene glycol can be also used as the cooling fluid (107) along with cryogenic cooling systems, however chilled water used with robust chilling system is preferred as chilled water is more cost effective as compared to ethylene glycol. Temperature control is for the purpose of preventing degeneration of the rubber and to ensure that only the sulphur bonds are broken so that recoverable properties of the rubber are maximized. At elevated temperatures, the high heat can cause scission of the main chain polymer thereby affecting the carbon to carbon bonds to be broken, which leads to depolymerisation and rubber damage.

The resultant devulcanized rubber as obtained from the method as described in the present invention has good stability with delayed hardening to provide a pro-longed shelf life of more than 6 months to 1 year. The devulcanized rubber can be revulcanized by the addition of sulphur depending on the rubber properties as desired by adjusting the formulation or recipe of the virgin rubber compound to the revulcanized product.

EXAMPLES

Example 1

As an exemplary, vulcanized rubber particles with a pre-determined size of 40 Mesh were added to the devulcanization tank (101) of the apparatus (100) of the present invention. The chemical composition was then added to the vulcanized rubber particles. As used in the example, the chemical composition comprises 0.30 parts per hundred rubber (phr) of N-Cyclohexyl-2-benzothiazole sulfenamide (CBS) as an accelerator, 0.30 parts per hundred rubber (phr) of zinc oxide as an inorganic activator and 1.50 parts per hundred rubber (phr) of stearic acid as an organic activator. The vulcanized rubber particles were devulcanized in the devulcanization tank (101) with the mass stirrer (102) at a speed of 24 rpm, and with the rotating shaft (103) and the branching members (107) at a speed of 2000 rpm. The rubber devulcanization was carried out at an optimum temperature of 80° C. for a processing period of about 10 minutes.

Optionally, napthenic oil which was used as a plasticizer in an amount of 15 parts per hundred rubber (phr) and clay which was used as filler in an amount of 15 parts per hundred rubber (phr) were introduced to the devulcanized rubber. Optionally, the devulcanized rubber was shaped into agglomerates by passing the devulcanized rubber through an extruder followed by a refiner mill. The devulcanized rubber in the form of agglomerates was then cooled and sent for packaging.

Example 2

In another exemplary, vulcanized rubber particles with a pre-determined size of 40 Mesh were added to the devulcanization tank (101) of the apparatus (100) as illustrated in FIG. 1. A chemical composition was then added to the vulcanized rubber particles, of which the chemical composition preferably comprising 0.75 parts per hundred rubber (phr) of N-Cyclohexyl-2-benzothiazole sulfenamide (CBS) as an accelerator, 0.70 parts per hundred rubber (phr) of zinc oxide as an inorganic activator and 2.50 parts per hundred rubber (phr) of stearic acid as an organic activator. In the devulcanization tank (101), the vulcanized rubber particles were devulcanized with the mass stirrer (102) at a speed of 24 rpm, and with the rotating shaft (103) and the branching members (107) at a speed of 3300 rpm. The rubber devulcanization was carried out at an optimum temperature of 80° C. for a processing period of about 15 minutes.

Napthenic oil and clay were optionally introduced to the devulcanized rubber. The napthenic oil was used in an amount of 15 parts per hundred rubber (phr) as a plasticizer and the clay was used in an amount of 15 parts per hundred rubber (phr) as filler. Optionally, the devulcanized rubber was shaped into agglomerates by passing the devulcanized rubber through an extruder followed by a refiner mill. The devulcanized rubber in the form of agglomerates was then cooled and sent for packaging.

Example 3

The devulcanized rubber produced from the method and apparatus (100) as claimed in the present invention was incorporated with virgin rubber to produce rubber compounds with desired physical properties.

Table 1 below shows physical properties of the rubber compounds in terms of tensile strength (Mpa), elongation at break (%) and abrasion resistance after the addition of devulcanized rubber. From the table, the proportions of the devulcanized rubber being added to the virgin rubber range from 5% to 20% with the increment of 1%. The control used was a medium quality virgin compound where the virgin compound is used in the commercial manufacture of used automobile tires.

TABLE 1

| Addition of Devulcanized Rubber | Tensile Strength (Mpa) | Elongation at Break (%) | Abrasion Resistance |
| --- | --- | --- | --- |
| Control | 15.58 | 504 | 178.2 |
| 5% | 16.12 | 517 | 180.6 |
| 6% | 16.14 | 512 | 179.0 |
| 7% | 15.81 | 490 | 176.4 |
| 8% | 15.76 | 479 | 175.0 |
| 9% | 15.83 | 490 | 171.8 |
| 10% | 15.95 | 491 | 170.7 |
| 11% | 15.63 | 467 | 177.7 |
| 12% | 16.05 | 474 | 178.1 |
| 13% | 16.00 | 479 | 167.2 |
| 14% | 15.88 | 465 | 167.2 |
| 15% | 15.60 | 453 | 175.3 |
| 16% | 15.90 | 450 | 175.2 |
| 17% | 15.70 | 445 | 177.1 |
| 18% | 15.60 | 460 | 178.2 |
| 19% | 15.80 | 460 | 170.2 |
| 20% | 16.04 | 456 | 169.1 |

It should be appreciated that based on Table 1, a person skilled in the art is capable of determining the amount of devulcanized rubber required to be added to virgin compounds in order to obtain rubber compounds with desired physical properties.

Example 4

Table 2 below shows the production of devulcanized rubber in three to four batches of 350 kg per hour using the method and apparatus (100) as claimed in the present invention.

TABLE 2

| Technology | Present Devulcanization |
|---|---|
| Batch Size | 350 kg |
| Batch Time | 15-20 min |
| % Usage in New Tires | 10-20% |
| Shelf Life | More than 6 months |
| Energy Use | Low |
| Economy | Good |
| Scalability | Yes |
| Cure Safety | Good |

The results disclosed in the table above shows that the method and apparatus (100) of the present invention provides high scalability in the production of devulcanized rubber at a low but controlled temperature, thus requiring lower energy usage.

Further, the low energy usage also benefits in terms of cost. Besides, the devulcanized rubber produced from the present invention provides better cure safety, longer shelf life and is highly compatible with the manufacturing of new tires and offers predictable performance.

The novel and inventive features of the present invention are hereinafter fully described and illustrated in the accompanying drawing and particularly defined in the appended claims; it being understood that various changes in the preferred embodiments may be without departing from the scope of the invention or scarifying any of the advantages of the present invention.

The invention claimed is:

1. A devulcanization apparatus for producing devulcanized rubber, the devulcanization apparatus comprising:
    a devulcanization tank in which the reaction between vulcanized rubber particles and a chemical composition is carried out;
    at least one mass stirrer positioned in the devulcanization tank in which the mass stirrer rotates in circular motion to generate impact forces;
    at least one rotating shaft positioned in the devulcanization tank in which the rotating shaft has at least one axial blade and at least one radial blade to facilitate impact forces generation; and
    a cooling container that envelops the devulcanization tank and that contains cooling fluid to control the temperature inside the devulcanization tank,
    a plurality of branching members extended perpendicularly from the rotating shaft,
    wherein the impact forces generated from the mass stirrer, the axial blade and the radial blade of the rotating shaft cause the vulcanized rubber particles to react with the chemical composition for producing the devulcanized rubber.

2. The devulcanization apparatus as claimed in claim 1, wherein the radial blade is attached to the branching members of the rotating shaft.

3. The devulcanization apparatus as claimed in claim 1, wherein the radial blade is tilted from the branching members at an angle ranging from 19° to 45°.

4. The devulcanization apparatus as claimed in claim 1, wherein the cooling fluid controls the temperature to a range of 60° C. to 100° C.

5. The devulcanization apparatus as claimed in claim 4, wherein the cooling fluid is chilled water.

6. The devulcanization apparatus as claimed in claim 4, wherein the cooling fluid is ethylene glycol.

7. Devulcanized rubber obtained according to the devulcanization apparatus as claimed in claim 1.

8. The devulcanization apparatus as claimed in claim 1, wherein the cooling fluid controls the temperature to 80° C.

* * * * *